(12) United States Patent
Hu et al.

(10) Patent No.: US 12,579,618 B2
(45) Date of Patent: Mar. 17, 2026

(54) IMAGING METHOD AND APPARATUS, AND COMPUTER-READABLE MEDIUM

(71) Applicant: NANJING UNIVERSITY, Nanjing (CN)

(72) Inventors: Xuemei Hu, Nanjing (CN); Chenxi Qiu, Nanjing (CN); Kai Wang, Nanjing (CN); Tao Yue, Nanjing (CN); Feng Yan, Nanjing (CN); Hongbing Pan, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 263 days.

(21) Appl. No.: 18/560,355

(22) PCT Filed: May 13, 2022

(86) PCT No.: PCT/CN2022/092615
§ 371 (c)(1),
(2) Date: Nov. 10, 2023

(87) PCT Pub. No.: WO2022/237891
PCT Pub. Date: Nov. 17, 2022

(65) Prior Publication Data
US 2024/0233090 A1    Jul. 11, 2024

(30) Foreign Application Priority Data

May 13, 2021    (CN) .......................... 202110522201.8

(51) Int. Cl.
*G06T 5/50*        (2006.01)
*G06V 10/25*       (2022.01)
(Continued)

(52) U.S. Cl.
CPC ................ *G06T 5/50* (2013.01); *G06V 10/25* (2022.01); *H04N 19/93* (2014.11); *H04N 23/698* (2023.01)

(58) Field of Classification Search
CPC ............. G06T 5/50; G06T 2207/20221; G06T 3/4076; G06V 10/25; G06V 10/803;
(Continued)

(56) References Cited

U.S. PATENT DOCUMENTS

2016/0027184 A1    1/2016  Courtney et al.
2021/0144357 A1*   5/2021  Kim ..................... H04N 13/271
(Continued)

OTHER PUBLICATIONS

Susan Chan et al: "Long-range depth imaging using a single-photon detector array and non-local data fusion", arxiv.org, Cornell University Library, 201 Olin Library Cornell University Ithaca, NY 14853, Dec. 11, 2018 (Dec. 11, 2018), XP080992171.
(Continued)

*Primary Examiner* — Phuoc Tran
(74) *Attorney, Agent, or Firm* — VOLPE KOENIG

(57) ABSTRACT

Provided are an imaging method and apparatus, and a medium. The method includes: for a target field of view, performing photographing and quantification at a first resolution, to obtain a first image that has a first bit width; for the target field of view, performing photographing and differential processing at a second resolution, to obtain a second image that has a second bit width, wherein the differential processing includes: for a pixel point obtained by photographing at the second resolution, quantifying the difference between the pixel point and a neighboring pixel point of the pixel point, to obtain a quantified difference a value of a corresponding pixel point in the second image; and fusing the first image with the second image, to obtain a third image, wherein the first resolution is lower than the second
(Continued)

resolution, and the first bit width is higher than the second bit width.

17 Claims, 9 Drawing Sheets

(51) Int. Cl.
 *H04N 19/93* (2014.01)
 *H04N 23/698* (2023.01)
(58) Field of Classification Search
 CPC ...... G06V 10/82; H04N 19/93; H04N 23/698;
  H04N 19/85; G06N 3/0464; G06N 3/09
 See application file for complete search history.

(56) References Cited

U.S. PATENT DOCUMENTS

| | | | | |
|---|---|---|---|---|
| 2021/0239863 | A1* | 8/2021 | Tavitian | G06T 11/008 |
| 2022/0044442 | A1* | 2/2022 | Liu | G06T 7/80 |
| 2022/0217272 | A1* | 7/2022 | Phillipp | G06T 5/50 |

OTHER PUBLICATIONS

Sven Fiergolla et al: "Improving Run Length Encoding by Preprocessing", arxiv . org, Cornell University Library, 201 Olin Library Cornell University Ithaca, NY 14853, Mar. 30, 2021 (Mar. 30, 2021), XP0819 01676.
Liu Yu et al: "Multi-focus image fusion with a deep convolutional neural network", Information Fusion, Elsevier, US, vol. 3 6 , Dec. 5, 2016 (Dec. 5, 2016), pp. 191-207, XP029899693, ISSN: 1566-2535, DOI: 10.1016/J.INFFUS.2016.12.001.

* cited by examiner

400

400

Control Gate

Top Dielectric Layer

Charge-coupled Layer

Bottom Dielectric Layer

STI Isolation

N+ Drain Terminal

P-shaped Substrate Collection Region

Readout Region

Composite Dielectric Gate Dual Transistor Photo Sensitive Detector

NAND Architecture

NOR Architecture

IMAGING METHOD AND APPARATUS, AND COMPUTER-READABLE MEDIUM

CROSS-REFERENCE TO RELATED APPLICATION

This disclosure claims the priority of China patent application filed to China Patent Office on May 13, 2021, with the application No. 202110522201.8 and the invention name of "IMAGING METHOD AND APPARATUS, AND COMPUTER-READABLE MEDIUM", the entire contents of which are incorporated into this disclosure by reference.

TECHNICAL FIELD

The application relates to an imaging method and apparatus, and computer-readable medium, and more specifically, relates to a method, an apparatus and a computer-readable medium for real-time imaging of ultra-large-scale pixels.

BACKGROUND

There are several existing imaging schemes that can get ultra-large-scale pixels (for example, it usually refers to hundreds of millions of pixels): (1) An imaging scheme realized by super-resolution technology, which magnifies a low-resolution image by a certain factor through traditional interpolation algorithm or image restoration algorithm based on neural network to increase the resolution of the image. However, due to the loss of information in the acquisition process, the restored image is too smooth or has false texture (especially when the magnification is too large), which leads to poor final imaging effect. (2) An imaging scheme realized by photographing several low-resolution partial images and splicing them into a complete image with ultra-large pixels; this system usually has the characteristics of large volume, heavy weight and complex circuit design; (3) An imaging scheme realized by single-chip ultra-large-scale pixel imaging. This system can capture ultra-large-scale pixel images through a single sensor chip, but it has the problems of slow reading speed and large amount of data, so it cannot collect and transmit video in real time. All the above methods directly collect information in the image domain, and because of the large amount of related data, it takes a long time to collect and transmit data, so it is impossible to capture video in real time.

SUMMARY

Technical Problem

The purpose of the present application is to provide a method, an apparatus and a computer-readable medium capable of rapidly and even in real time capturing ultra-large-scale pixel images.

Technical Solution

In order to overcome the technical problems in the above technical background and develop the photographing and processing technology for ultra-large-scale pixel images, according to one aspect of the present application, it is proposed a novel image collection and fusion technology. This technology collects two images with different resolutions and different bit widths for a target field of view (for example, high-resolution low bit-width differential image and low-resolution high bit-width image), and fuses the regions of interest in the two images using image fusion algorithm to update a complete image of the target field of view, so as to obtain a clear and ultra-large-scale pixel complete image of the target field of view quickly and efficiently.

According to one embodiment, sparse characteristics of differential images (relative to intra-frame) may be used to compression-encode the collected high-resolution differential image with low bit width, thereby greatly reducing data volume of the image, improving a reading speed, reducing a transmission bandwidth, and contributing to the real-time collection of ultra-large-scale pixel images.

According to one embodiment, an image fusion algorithm based on convolutional neural network may also be used to fuse the high-resolution differential image with low bit width and the low-resolution image with high bit width and reconstruct them.

According to one embodiment, an image recognition method may also be used for the collected image, for example, the region of interest included in the collected image is determined and recognized based on morphological and/or dynamic characteristics, and the morphological and dynamic characteristics of the region of interest are selectively output.

According to one aspect of the application, the application provides a method for imaging, further comprising: for a target field of view, performing photographing and quantification at a first resolution, so as to obtain a first image that has a first bit width; for the target field of view, performing photographing and differential processing at a second resolution, so as to obtain a second image that has a second bit width, wherein the differential processing includes: for a pixel point which is obtained by means of photographing at the second resolution, quantifying the difference between the pixel point and a neighboring or adjacent pixel point of the pixel point, so as to obtain a quantified difference as a value of a corresponding pixel point in the second image; and fusing the first image with the second image, so as to obtain a third image, wherein the first resolution is lower than the second resolution, and the first bit width is higher than the second bit width.

According to one embodiment, the fusing the first image with the second image, so as to obtain a third image further includes: determining a region of interest of the target field of view in the second image using an image recognition method; obtaining a region in a first image that corresponds to the region of interest; and fusing the corresponding region of the first image with the region of interest of the second image to obtain the third image.

According to one embodiment, for a pixel point captured at the second resolution, the quantizing a difference between the pixel and the adjacent or similar pixel includes: quantizing the difference to a selected array.

According to one embodiment, the array is $\{-1, 0, +1\}$. In this way, image data can be stored, processed and transmitted with a very small number of bits, i.e., the most economical data resources.

According to one embodiment, the value of the pixel point may also be divided into five levels, for example, two thresholds are used to compare the value of the pixel point in positive and negative directions. For example, the array is $\{-2, -1, 0, +1, +2\}$. This five-value array scheme is more conducive to recognition and fusion than the three-value array scheme, especially to real-time and accurate recognition and location of the region of interest.

According to one embodiment, the value of the pixel point may also be divided into four levels, for example, two thresholds may be used to compare the value of the pixel point in the positive and negative directions. For example, the array $\{-2, -1, 0, +1\}$ or $\{-1, 0, +1, +2\}$. Using this four-value array scheme, only two bits are needed to represent the value of the pixel point.

According to the embodiment of the application, the target field of view corresponding to the first image is the same as the target field of view corresponding to the second image. In practice, there are usually differences in time and/or space between them. This is because there may be a slight difference in the location and time of photographing two images, so that the two fields of view of targets may not necessarily coincide completely. However, as long as the regions where they overlap with each other are the practical main parts of the image, or both cover the regions of interest, they can be considered as the same or equivalent fields of view. That is, the fields of view photographed with time difference and/or space differences that are within a tolerable range can be regarded as the same field of view.

According to one embodiment, the method further includes encoding the second image for transmission before the fusing, and decoding the second image for fusion after the transmission.

According to one embodiment, the second image is encoded using run-length coding, wherein a bit sequence of the second image is encoded into a counting sequence L that records a number of repetitions of repeated data and a data sequence D that records the repeated data itself.

According to one embodiment, Huffman encoding is used to record the counting sequence L, and fixed-length coding is used to record the data sequence D.

According to one embodiment, the fusing the first image and the second image includes: fusing the first image and the second image using a convolutional neural network.

According to one embodiment, the using an image recognition method to determine the region of interest of the target field of view in the second image includes: determining the region of interest by combining images captured for the target field of view within a specific time range or previously stored images captured for the target field of view.

According to one embodiment, the method further comprises using deep learning to train the image recognition method based on a selected target, spatial conditions when photographing, and manual annotations.

According to one embodiment, the fusing the region of interest with the corresponding region to obtain the third image further comprises: fusing the region of interest with the corresponding region to obtain the third image only when the region of interest includes a specific object.

According to one embodiment, the method further includes outputting the third image after fusion or outputting an updated complete image after updating the complete image with the third image.

According to one embodiment, a camera or a video camera that implements the method of the present application can be manufactured.

For discovery and reporting of the region of interest, it may be difficult to report the image in real time due to the limitations of capabilities of the system, especially the hardware. As a beneficial improvement, the camera or video camera of the application can extract the region of interest and report it when it is found that the region of interest includes a specific object, so as to better meet the real-time requirements.

According to another aspect of the present application, the present application also provides an apparatus for imaging, including: an image capturing component configured to for a target field of view, perform photographing and quantification at a first resolution, so as to obtain a first image that has a first bit width; and for the target field of view, perform photographing and differential processing at a second resolution, so as to obtain a second image that has a second bit width, wherein the differential processing includes: for a pixel point which is obtained by means of photographing at the second resolution, quantifying the difference between the pixel point and a neighboring or adjacent pixel point of the pixel point, so as to obtain a quantified difference as a value of a corresponding pixel point in the second image; and a data processing component coupled to the image capturing component and configured to fuse the first image with the second image, so as to obtain a third image, wherein the first resolution is lower than the second resolution, and the first bit width is higher than the second bit width.

According to one embodiment, the fusing the first image with the second image, so as to obtain a third image, further includes: determining a region of interest of the target field of view in the second image using an image recognition method; obtaining a region corresponding to the region of interest in the first image; and fusing the corresponding region of the first image with the region of interest of the second image to obtain the third image.

According to one embodiment, for a pixel point captured at the second resolution, the quantizing a difference between the pixel and the adjacent or similar pixel includes: quantizing the difference to a selected array.

According to one embodiment, the array is $\{-1, 0, +1\}$ or $\{-2, -1, 0, +1, +2\}$ or $\{-2, -1, 0, +1\}$ or $\{-1, 0, +1, +2\}$.

According to one embodiment, the apparatus further comprises an encoding component and a transmission component, wherein the encoding component is coupled to the image capturing component and is configured to encode the second image before the fusing; the transmission component is coupled to the encoding component and the data processing component, and is configured to transmit the encoded second image to the data processing component, and the data processing component is further configured to decode the encoded second image for fusion after receiving the encoded second image.

According to one embodiment, the encoding component is further configured to encode the second image using run-length encoding, wherein a bit sequence of the second image is encoded into a counting sequence L recording the number of repetitions of repeated data and a data sequence D recording the repeated data itself.

According to one embodiment, the encoding component is further configured to record the counting sequence L using Huffman encoding and record the data sequence D using fixed-length encoding.

According to one embodiment, the fusing the first image and the second image includes: fusing the first image and the second image using a convolutional neural network.

According to one embodiment, using an image recognition method to determine the region of interest of the target field of view in the second image includes: determining the region of interest by combining images captured for the target field of view within a specific time range or previously stored images captured for the target field of view.

According to one embodiment, the data processing component is further configured to use deep learning to train the image recognition method based on the selected target, the spatial conditions when photographing, and the manual annotation.

According to yet another aspect of the present application, it is also provided a non-transitory computer-readable medium having program codes recorded thereon, which, when executed by a computer, performs the method as described above.

By using the technical scheme of the application, the reading time is shortened by reducing the number of bits of the collected image, which is helpful to realize the real-time readout of ultra-large-scale pixel differential images; in the process of image fusion, the convolution neural network operation can effectively improve accuracy and recognizability of the image and obtain a clear ultra-large pixel image. In addition, by using the optimized on-chip compression encoding and decoding scheme, the image data can be compressed in a targeted manner, therefore the transmission bandwidth is greatly reduced, and real-time and even high-speed image transmission can be realized.

DETAILED DESCRIPTION

Figure 1A:
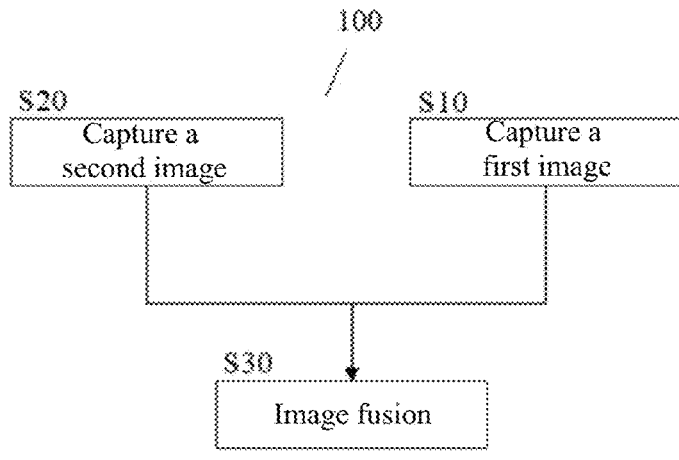
FIGS. 1A-1B are schematic diagrams of a flow of a method for imaging according to an embodiment of the present application.

In the following, the method, apparatus and computer-readable medium of the present application will be described in an exemplary manner with the attached drawings and specific embodiments. Obviously, the described embodiment is only a part of the embodiment of the present disclosure, not the whole embodiment. Generally, components of embodiments of the present disclosure described and illustrated in the drawings may be arranged and designed in various different configurations. Therefore, the following detailed description of the embodiments of the disclosure provided in the accompanying drawings is not intended to limit the scope of the claimed disclosure, but merely represents selected embodiments of the disclosure. Based on the embodiments of the present disclosure, all other embodiments obtained by those skilled in the art without creative work belong to the scope of protection of the present disclosure.

It should be noted that similar numbers and letters indicate similar items in the following drawings, so once an item is defined in one drawing, it does not need to be further defined and explained in subsequent drawings.

Figure 1B:
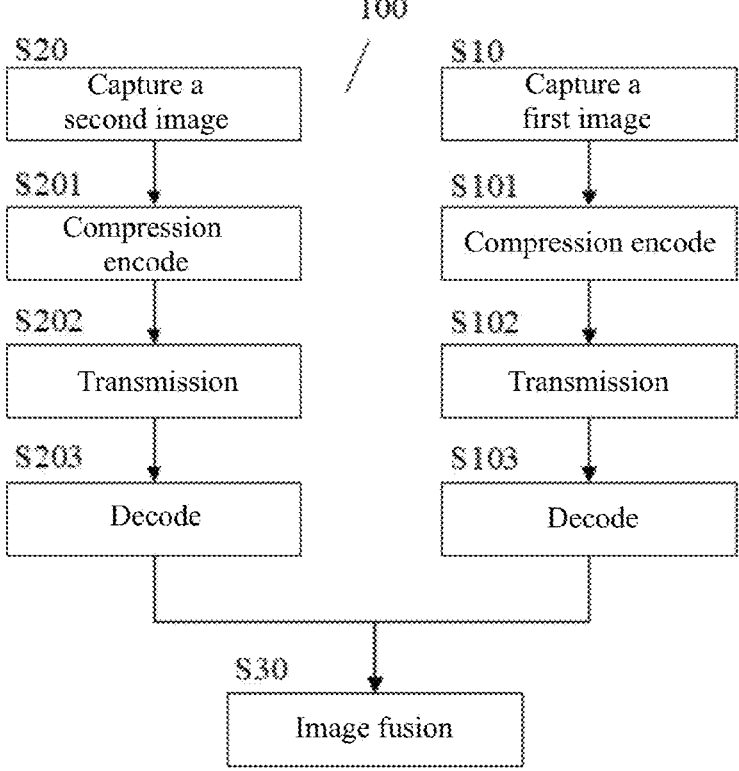

FIGS. 1A-1B are schematic diagrams of a flow of a method 100 for imaging according to an embodiment of the present application. The method 100 can be used for image collection, processing and output.

As shown in FIG. 1A, in this method 100, two images (for example, two images with differences in pixel and bit width) are respectively collected (or captured) for the target field of view in a parallel manner, i.e., the first image (for example, the original image with low resolution and high bit width) is collected by a process or channel shown in the right half of the figure (step S10), and the second image (step S20) is collected by a process or channel shown in the left half of the figure. If a set of image capturing components is used, the above-mentioned two types of images are collected successively. If two sets of image capturing components are used, the above two types of images may be collected at the same time, or concurrently. The present application does not impose any restrictions on the number of image capturing components used.

Then, the collected first image and second image may be fused (step S30). According to an embodiment, a first image may be collected with a first resolution and a first bit width, and a second image may be collected with a second resolution and a second bit width, herein the second image may be a differential image subjected to differential processing. According to an embodiment, the first resolution may be lower than the second resolution, and the first bit width may be higher than the second bit width, for example, the first resolution may be much lower than the second resolution (for example, lower than 10 times), the first bit width may be 8 bits, and the second bit width may be 2 bits. In this case, relatively speaking, the first image with low resolution and high bit width may be used to obtain rough information (for example, background) of the target field of view, while the second image with high resolution and low bit width may be used to obtain fine information (for example, vehicles appearing in the target field of view), and the first image contains less data, while the second image contains more data.

According to the embodiment of the present application, the second image can be subjected to differential processing, which includes: quantizing the difference between the captured pixel (for example, each pixel in the second image captured at the second resolution) and adjacent or similar pixel of the pixel to obtain the quantized difference as a value of the corresponding pixel in the second image. Thereby, a second image with a second bit width (such as a low bit width of 2 bits) is obtained.

In the description above and below, the present application does not impose any restrictions on the so-called first or second resolution (or high/low resolution) and the first or second bit width (or high/low bit width), and their meanings may be relative, and those skilled in the art can set their specific values as needed to obtain favorable technical effects.

Optionally, as shown in FIG. 1B, after the collection of the first and second images (steps S10 and S20) is completed, the collected images can be encoded (steps S101 and S201) to improve transmission efficiency in subsequent transmission (steps S102 and S202). After receiving the transmitted encoded image, a receiving end decodes it (steps S103 and S203) and fuses the images (step S30), and finally obtains a third image (for example, an image with high resolution and high bit width and a field of interest). Here, the third image is a complete image for the target field of view, and may contain rough information of the first image and fine information of the second image. Here, a complete image may refer to an image of a complete region of field of view (for example, a high-resolution image with high bit width). At the receiving end, one receiver may be used to receive the encoded data of the above two types of images alternately, or two receivers may be used to receive the encoded data of the above two types of images separately and simultaneously. The present application does not impose any restrictions on the receiving mode here.

Figure 2A:
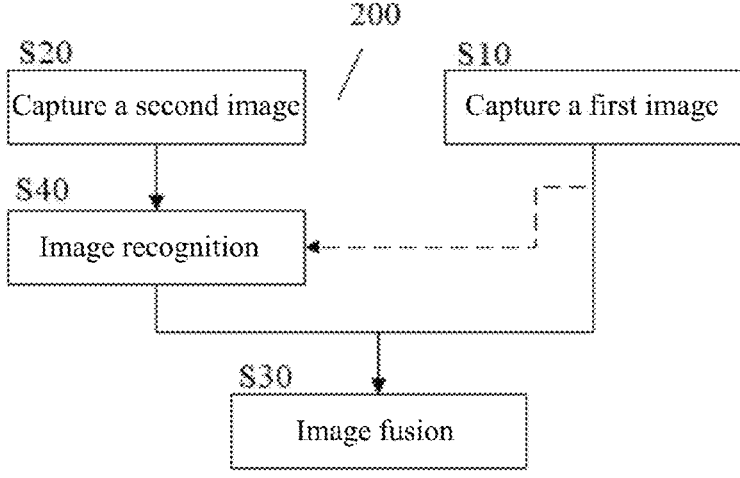
FIGS. 2A-2B are schematic diagrams of another flow of a method for imaging according to an embodiment of the present application.
Figure 2B:
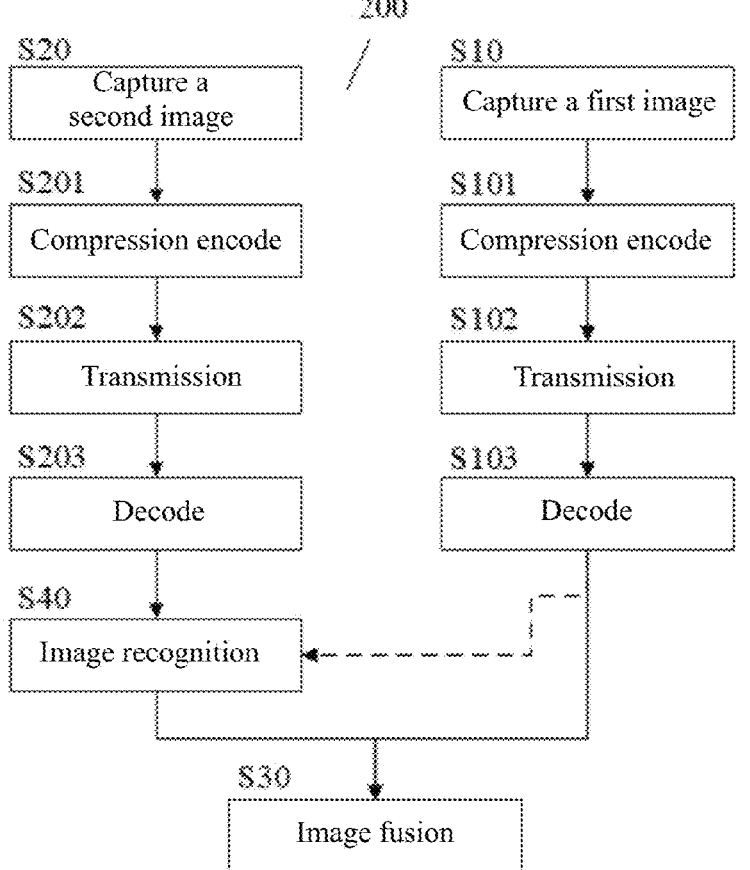

FIGS. 2A-2B are schematic diagrams of another flow of a method 200 for imaging according to an embodiment of the present application. The method 200 may be regarded as an improvement of method 100. As shown in FIGS. 2A and 2B, similar to FIGS. 1A-1B, using this method 200, two images may also be collected in parallel, i.e., the first image (for example, an original image with low resolution and high bit width) is collected by the process or channel shown in the right half of the figure (step S10), and the second image (for example, a differential image with high resolution and low bit width) is collected by the process or channel shown in the left half of the figure (step S20). Description of the same or similar steps is omitted here.

Unlike FIGS. 1A-1B, in FIGS. 2A and 2B, before image fusion (step S30), an image recognition method can be used to recognize the region of interest in the second image (and alternatively, the first image, which may contain rough information, as shown by the dotted line in the figure) (step S40). For example, based on empirical data (e.g., morphological characteristics of different targets), based on data of one image or several consecutive images (e.g., previously captured) or several images captured within a predetermined time range, image recognition (e.g., for a specific object) and detection of motion characteristics can be performed on the target concerned in the visual field. The image recognition method may only include recognizing an image region where a specific object may exist, or may or may not include recognizing a specific object (for example, a vehicle) included in the region of interest, but the present application does not impose any restrictions on the specific image recognition method, which may be any method or algorithm capable of extracting the region of interest (or a motion region involving motion) from an image.

In addition, before or after image fusion, the objects in the visual field may also be recognized and dynamically judged by manual vision or computer scanning according to empirical data or materials of the concerned target shape.

According to the embodiment of the application, the first image and the second image may be directly fused (to obtain a third image as a complete image of the field of view), or a part of the first image and a corresponding part of the second image may be fused (to obtain a third image as a partial image of the field of view). For example, the fusing the first image with the second image may include: using an image recognition method to determine the region of interest of the target field of view in the second image; obtaining a region corresponding to the region of interest in the first image; and fusing the corresponding region of the first image with the region of interest of the second image to obtain the third image. For example, it is also possible to fuse the region of interest with the corresponding region to obtain a third image only when the region of interest includes a specific object (for example, when it is determined that the region of interest includes a specific object such as a car or a person by computer recognition or manual recognition).

In addition, the third image may be output after fusion, or the updated complete image may be output after updating the complete image with the third image.

According to an embodiment of the present application, a method (for example, method 100) for real-time imaging of ultra-large-scale pixels may include the following steps:

Step 1 (or Steps S10 and S20): for example, a high-resolution differential image with low bit width (for example, 2 bits) and a low-resolution original image with high bit width (for example, 8 bits) are obtained by photographing and quantizing the target field of view. The collecting speed can be improved by reducing the number of bits of the differential image (i.e., the original image is obtained by differential processing when photographing), which is helpful to achieve the effect of real-time imaging. According to the embodiment of the present application, for example, a differential image with a ternary bit width of 2 bits (for example, $\{-1, 0, 1\}$) may be used here for image fusion, so as to obtain a clear fused image. The collecting of low-resolution and high bit width original images may be realized by using ordinary commercial sensor chips.

Step 2 (or step S101 and/or step S201): The high-resolution differential image with low bit width is compressed and encoded by using sparsity characteristics of the differential image data, so as to reduce the data transmission bandwidth, thus contributing to the purpose of real-time transmission. Optionally, the original image with low resolution and high bit width may be compressed and encoded as required. Generally, the data size of the original image with low resolution and high bit width is much smaller than the data size of the differential image with high resolution and low bit width.

For example, the compression-encoding method may be composed of two parts: optimized run-length encoding and Huffman encoding. The run-length encoding is to encode an original bit sequence into a counting sequence L that records the number of repetitions of data and a data sequence D that records the repeated data itself. On the one hand, numerical distribution of the counting sequence L that records the number of the repeated times is very uneven, so the Huffman variable-length encoding may be used instead of the fixed-length encoding scheme to further reduce data volume. On the other hand, for the data sequence D that records the repeated data itself, theoretically, three different values of the differential image need to be represented by two bits. However, since two adjacent data in the run-length encoded data sequence D must be unequal, there are only two possibilities for the next data of the current data. Therefore, a larger possible value may be recorded as 1 and a smaller possible value may be recorded as 0. The encoding based on the above principle can further reduce the data volume and promote the transmission bandwidth to meet the conditions of real-time transmission (step S102 or step S202).

Step 3 (or Step S103 or Step S203): The transmitted high-resolution differential image with low bit width (and optionally, the transmitted encoded low-resolution original image with high bit width) is decoded in Step 2.

Step 4 (or step S30): The (decoded) high-resolution differential image with low bit width is fused with the (decoded) low-resolution original image with high bit width. In the present application, the image fusion algorithm based on convolutional neural network may be used to fuse and reconstruct them.

According to the embodiment of the application, when collecting the original image with low resolution and high bit width, the captured field of view is the target field of view, and when photographing the differential image with high resolution and low bit width, it is ideal to use the same field of view as the original image with high bit width. However, in practice, since these two operations are not necessarily carried out at the same time, or even carried out by the same apparatus, the fields of view targeted by these two images are not necessarily exactly the same. According to the purpose of the scheme of the present application, as long as the field of view of the first image (for example, an original image with low resolution and high bit width) is approximately the same as the field of view of the second image (for example, a differential image with high resolution and low bit width), the third image generated by the method and apparatus of the present application can be obtained through later image processing (for example, image fusion with the same field of view part) to update the complete image or the region of interest of the field of view. In other words, according to the embodiment of the present application, the above two fields of view corresponding to the first image and the second image can both be called the target field of view, and the target field of view may be defined as a field of view in a specific time and/or a specific space, and certain differences are allowed in time and space.

According to the embodiment of the present application, the method of obtaining a high-resolution differential image with low bit width may be, for example, capturing a high-resolution original image in the same field of view as the original image, and differentially comparing the pixel in the high-resolution original image with the adjacent or similar pixel. For example, a comparison result (the difference between them) may be quantized into one of {−1, 0, +1} according to the judge of {less than, equal to, greater than} (which can be called "three-interval method"). The above operations (differential comparison and quantization) may be repeated for multiple pixels of the high-resolution original image to finally generate a high-resolution differential image with low bit width. For example, the above operations may be repeated for each pixel, or for pixels with fixed intervals (for example, every adjacent two rows/columns) or variable intervals or a plurality of representative pixels of the field of view selected in other ways, and the present application does not impose any restrictions on this. In this paper, the above process of differential comparison and quantization can be called "differential processing".

For example, the differential processing may be to compare pixel values of two adjacent pixel points, i.e., to compare the pixel values of the $(n+1)^{th}$ pixel and the $(n)^{th}$ pixel in a certain direction. In a similar way, the pixel value of the $(n+2)^{th}$ or $(n+3)^{th}$ pixel may also be compared with the pixel value of the nth pixel, i.e., the pixel value of the $(n+i)^{th}$ pixel $(i=1, 2, \ldots)$ may be compared with the pixel value of the $n^{th}$ pixel. This situation is especially suitable for general occasions that do not need high spatial resolution, such as routine screening (such as whether there is a new object in the field of view), which may be used to find out whether there is an abnormal situation. For example, the differential comparison may be made every two rows or every two columns.

As mentioned above, when quantizing the pixel value into one of {−1, 0, +1}, the pixel value may take, for example, a brightness value or other values representing color, which may be, for example, one of 256 values and can be represented by 8 binary bits. In the differential comparison of pixel values, the judge may only be based on the direct difference between them, i.e., as long as they are different, even if the difference only corresponds to one of 256 values (for example, the difference is L), the judge of −1 or 1 can be made; accordingly, if the difference is 0, the judge is 0. In addition, for example, the judge basis may be set as: the difference between them is greater than or equal to a threshold value, such as 4 out of 256 values, and it will be judged as different only when the judge basis is met, and −1 or 1 will be output accordingly. This processing method may be used, for example, to qualitatively show the details at the edge of an image with high contrast.

As another embodiment of the present application, a more complicated quantizing scheme as described below may also be used.

For example, with the five-interval method, two thresholds are used, namely thresholds C1 and C2, where C1 and C2 are both greater than 0 and C2>C1, It can be judged whether the comparison result (difference) of pixel values meets the following conditions: <−C2, <−C1, and in an interval close to a reference value (for example, 0), >C1, >C2. In other words, it is judged which interval the comparison result is in, and the comparison results of pixel values are assigned as {−2, −1, 0, 1, 2} respectively, i.e.:

$$
\begin{cases}
-2, & O < -C2 \\
-1, & -C2 \le I < -C1 \\
0, & -C1 \le I \le C1 \\
1, & C1 < I \le C2 \\
2, & I > C2
\end{cases}
$$

Wherein I represents the result before quantization (e.g., the result of differential comparison, i.e., the difference as described above). In this way, the pixel value can be measured in a wide region. However, this five-interval method needs 3 bits to represent the comparison results of pixel values, which takes up more resources.

Compared with the above-mentioned five-interval method, the four-interval method saves resources slightly, and also uses the same two thresholds, namely thresholds C1 and C2, wherein C1 and C2 are both greater than 0, and C2>C1. It can be judged whether the comparison result of pixel values meets the following conditions: <−C2, <−C1, and in an interval close to a reference value (for example, 0), >C1. In other words, it is judged which interval the comparison result is in, and the comparison result of pixel value is assigned as one of {−2, −1, 0, 1} respectively, i.e.:

$$\begin{cases} -2, & I < -C2 \\ -1, & -C2 \le I - C1 \\ 0, & -C1 \le I \le C1 \\ 1, & I\ C1 \end{cases}$$

Alternatively, it can be judged whether the pixel value meets the following conditions: <−C1, and in an interval close to a reference value (for example, 0), >C1, >C2. In other words, it is judged which interval the comparison result is in, and the comparison result of pixel value is assigned to one of {−1, 0, 1, 2} respectively, i.e.:

$$\begin{cases} -1, & I - C2 \\ -0, & -C2 \le I - C1 \\ 1, & -C1 \le I \le C1 \\ 2, & I\ C1 \end{cases}$$

Wherein I represents the result before quantization (e.g., the result of differential comparison, i.e., the difference as described above). In this way, only two bits are needed to represent the comparison results of pixel values.

Differential images with different bit widths can be obtained based on any one of the three-interval (three-valued) method, four-interval (four-valued) method and five-interval (five-valued) method described above. In the following, the application will be described in detail with reference to the drawings of the application and specific examples of three-valued cases. The following examples are only illustrative and not restrictive. It should be noted that the principle of the four-valued or five-valued embodiment is the same as the principle of the following three-valued embodiment.

Embodiment 1

In this embodiment, a method (e.g., method 100) for imaging is designed based on a high-resolution low bit width (three-valued, {−1, 0, 1}) differential image and a low-resolution high bit width (e.g., 8 bits) gray-scale image, and the specific steps include the following:

Step 1-1 (or Steps S10 and S20): A low-resolution gray-scale image with high bit width and a high-resolution differential image with low bit width are obtained by photographing and quantizing the target field of view. For example, the resolution of a low-resolution gray-scale image with high bit-width may be ¹⁄₆₄ of the resolution of a high-resolution differential image with low bit-width, and the high-resolution differential image with low bit-width may be based on the difference between every two adjacent columns in its corresponding original image, and its default quantization intervals may be, for example, [−255, −4), [−4, 4] and (4, 255]. In this way, the differences can be assigned to {−1, 0, 1} by using the three-interval method according to the quantization interval (i.e., these three intervals correspond to −1, 0 and 1 respectively). By reducing the number of bits of the differential image collected, the collecting speed can be improved, which is helpful to achieve the effect of real-time imaging.

Step 1-2 (or Steps S101, S102 and/or S201, S202): The high-resolution differential image with low bit width is compressed and encoded using the sparsity characteristics of differential images to reduce the data transmission bandwidth, thus contributing to the purpose of real-time transmission.

For example, the compression-encoding method may be composed of optimized run-length encoding and Huffman encoding. Specifically, the run-length coding is to encode the original bit sequence into a counting sequence L that records the number of repetitions of data and a data sequence D that records the repetitive data itself. On the one hand, the numerical distribution of the counting sequence L, which records the number of repetitions, is very uneven, so the Huffman encoding may be used instead of the fixed-length encoding scheme to further reduce the data volume. On the other hand, for the data sequence D that records the repeated data itself, theoretically, two adjacent data must be unequal. In this case, the value of the differential image has three possibilities, while the next data of the current data has only two possibilities, so in the data sequence D, only the first data has three possibilities, and each subsequent data has only two possibilities. Therefore, the first data can be encoded with 2 bits, and each remaining data can be encoded with 1 bit.

Step 1-3 (or step S103 and/or S203): At the receiving end, the encoded high-resolution differential image with low bit width is decoded.

Step 1-4 (or step S30): The high-resolution differential image with low bit width and the low-resolution gray-scale image with high bit width are fused.

In this embodiment, the image fusion algorithm based on convolutional neural network may be used to optimize the fusion and reconstruction of the two. In this embodiment, channels of the input high-resolution differential image with low bit width and the low-resolution image with high bit width are all 1, and the resolution of the output high-resolution image with high bit width is the same as the resolution of the input high-resolution differential image with low bit width, and the number of channels is 1.

Figure 3:
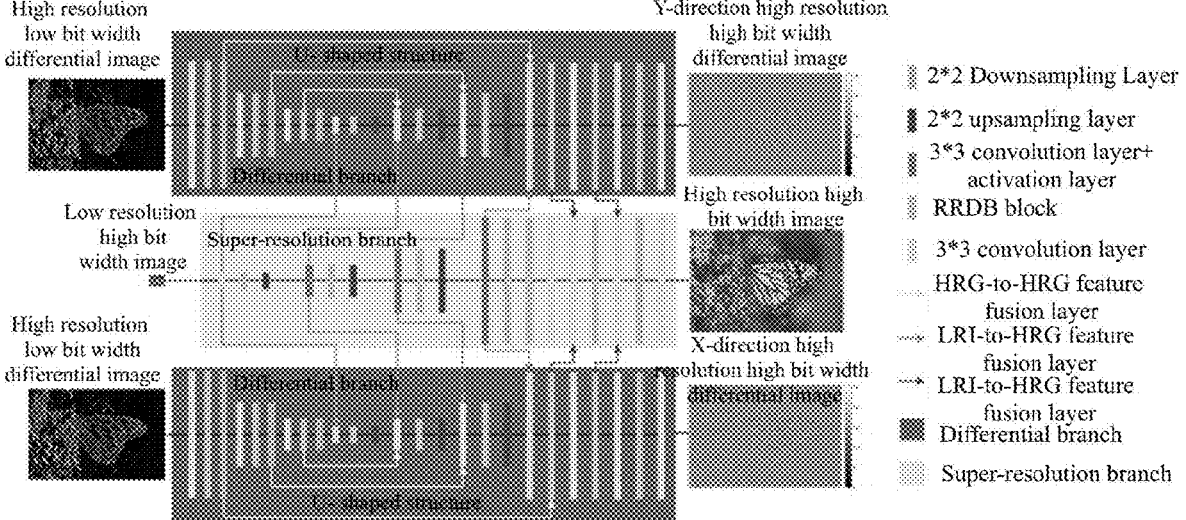
FIG. 3 is a block diagram of an image fusion algorithm based on convolutional neural network according to an embodiment of the present application.

FIG. 3 is a block diagram of an image fusion algorithm based on convolutional neural network according to an embodiment of the present application. The network structure of the convolutional neural network will be introduced with reference to FIG. 3.

According to the embodiment of the present application, two input images (for example, a high-resolution image with low bit width and a low-resolution image with high bit width) may have differences in resolution, for example, the resolution of one image may be ¹⁄₆₄ of the resolution of the other image. In order to deal with this resolution mismatch, a multi-scale feature fusion network can be used to fuse the high-frequency information of the high-resolution differential image with low bit width and the low-frequency information of the low-resolution image with high bit width at different scales.

As shown in FIG. 3, this multi-scale feature fusion network can be divided into three different branches, namely a super-resolution branch and two differential branches. The input of the super-resolution branch is a low-resolution image with high bit width, and the output is a corresponding (for example, 8*8 times) high-resolution image with high bit width. In the second half of the super-resolution branch, the high-frequency components from two differential branches are fused by using feature fusion connection, which is used to synthesize the high-resolution image with high bit width with clear details. The inputs of the two differential branches are high-resolution differential images with low bit width. Since the differential images in this embodiment have only one x direction (i.e., the differential comparison between columns), the inputs of the two branches are the same, and they are all differential images in the x direction. In order to better fuse, the two differential branches output high-resolution differential images with high bit width in the x direction (i.e., the differential comparison between columns) and the y direction (i.e., the differential comparison between rows) respectively. To achieve this goal, supervised graphs of the two differential branches when being trained use high-resolution differential images with high bit width in the x direction and the y direction respectively, and both differential branches fuse low-frequency components from super-resolution branches at different scales to guide high-resolution differential images with high bit width.

The details of each branch structure are introduced below, including feature fusion connection, loss function and training strategy.

Referring to FIG. 3, the super-resolution branch may be divided into two parts. The first part completes the super-resolution processing of the input low-resolution image with high bit width (for example, 8*8 times), and at the same time obtains feature graphs on different scales, which can be used to guide the fusion and reconstruction of the differential branch; in the second part, the feature graph from the differential branch is fused to complete the fusion and reconstruction of the final high-resolution image with high bit width. Super-resolution branching can use a progressive super-resolution algorithm. For example, 2*2 up-sampling layer can be used 3 times to achieve 8*8 times super-resolution, and the up-sampling layer can be realized by deconvolution. In the second half of the network, the super-resolution branch combines the characteristics of two differential branches to complete the final fusion and reconstruction.

Referring to FIG. 3, the structures of the two differential branches are the same, but their supervised graphs may be different and may not share parameters. The first half of the differential branch may use a U-shaped structure similar to U-net, but different from U-net, RRDB (Residual-in-Residual Dense Block) may also be used to replace a basic convolution layer. A Max pooling layer may be used as the down-sampling layer and a deconvolution layer may be used as the up-sampling layer. RRDB and the maximum pooling layer may be combined as a basic down-sampling module, and in the process of down-sampling, four feature graphs on different scales (for example, original scale, ½*½ resolution, ¼*¼ resolution and ⅛*⅛ resolution) may be obtained by using the 2*2 down-sampling module 3 times, and these feature graphs will be fused with feature graphs in the up-sampling process in the way as shown in FIG. 3. RRDB and deconvolution layer may be combined as a basic 2*2 up-sampling module, and the feature graph may be restored to the original size by using the 2*2 up-sampling module 3 times, and the feature graph obtained by down-sampling the same differential branch and the feature graph obtained by up-sampling the super-resolution branch may be fused on different scales in the up-sampling process.

According to the embodiment of the present application, the algorithm of feature fusion connection may include three feature connections: high-resolution differential image-to-high-resolution differential image (HRD-to-HRD) feature fusion connection, low-resolution original image-to-high-resolution differential image (LRI-to-HRD) feature fusion connection and high-resolution differential image-to-low-resolution original image (HRD-to-LRI). They are located in different locations of the network and play different roles. Each feature connection uses operations of splicing feature graphs (Concat). In the first half of the whole network, all three branches have a multi-scale structure. In this part, the feature graph of the super-resolution branch may be fused to the up-sampling part of the two differential branches (LRI-to-HRD feature fusion connection), and at the same time, the feature graph generated during the down-sampling process from the same differential network may be fused to the up-sampling part (HRD-to-HRD feature fusion connection); in the second half of the whole network, the feature graphs generated by two differential branches may be fused into the super-resolution branch (HRD-to-LRI feature fusion connection) to complete the final fusion. In this network, the number of feature graphs of each layer is set to 16 except the layer containing feature fusion connection. In the layer containing feature fusion connection, the number of feature graphs is an integer multiple of 16, and its multiple is the number of fused different branches. For example, the number of feature graphs when two branches are fused is 32.

According to the embodiment of the application, a minimum mean square error between the clear high-resolution image with high bit width and the fusion result may be used as a loss function (MSELoss) of the super-resolution branch. At the same time, the minimum mean square error between the high-resolution high bit-width differential images in X direction and Y direction and outputs of the two differential branches may be used as the loss functions of the two differential branches respectively. Therefore, the total loss function may be expressed by the following equation:

$$L =$$
$$L_{SR} + L_x + L_y = \left\| F\left(I^{SR}\right) - I^{HR} \right\|_2 + \beta \left\| F\left(D_x^{LB}\right) - D_x^{HB} \right\|_2 + \gamma \left\| F\left(D_y^{LB}\right) - D_y^{HB} \right\|_2$$

According to the embodiment of the application, in terms of training methods, a DIV2K super-resolution data set may be used to make a training set. For example, when training, a convolution kernel size is set to 3, Adam algorithm is used as the optimizer, super-parameters $\beta$ and $\gamma$ in the loss function is set to 0.1, and a learning rate is set to $1 \times 10^{-4}$. After every 20K iterations, the learning rate is multiplied by an attenuation factor of 0.5, and a total of 100K iterations are trained, and Batchsize is set to 16.

Embodiment 2

This embodiment proposes an imaging method (for example, method 200) in which image recognition based on differential images is added. Different from directly recognizing image on the original image without differential processing, this embodiment directly recognizes the image on the differential image, and only fuses the region of interest after recognizing the region of interest.

Step 2-1: Same as Step 1-1 of Embodiment 1;
Step 2-2: Same as Step 1-2 of Embodiment 1;
Step 2-3: Same as Step 1-3 of Embodiment 1;

Step 2-4: Construct a training data set, and use the generated training set to train a method for image recognition (e.g., YOLOv3) to obtain a trained image recognition method. The training data set of this embodiment may be generated by public image recognition data set or by manual annotation. The two methods are as follows:

1) Generated by a public data set: After downloading the public image recognition data set, the tags are not processed, but the original images (e.g., high-resolution unquantized original images) in the data set are subjected to the above-mentioned differential processing according to a quantization interval set in step 2-1 to obtain corresponding differential images (e.g., high-resolution differential images with low bit width), and then a paired training sets are generated by combining existing tags in the data set.

2) Generated by manual labeling: Manually labeling the regions of interest in the collected differential images to form data pairs, thus constructing the training data set.

Herein step 2-4 may usually be performed in advance, i.e., the existing trained image recognition method is adopted when this method is implemented. Generally, step 2-5 is directly jumped to after obtaining the high-resolution differential image with low bit width in step 2-3.

Step 2-5: The trained image recognition method (YOLOv3 obtained in step 2-4) may be used to apply the image recognition method to the high-resolution differential image with low bit width to identify the region of interest.

Step 2-6: The corresponding region corresponding to the identified region of interest in the low-resolution image with high bit width (for example, determined by the location of the region of interest in the target field of view).

Step 2-7: The identified region of interest is fused with the identified corresponding region to obtain a fused image (third image) for the region of interest, herein the fusion method may be the same as the method in Step 1-4 of Embodiment 1. For example, the fused image may be used to update the complete image of the field of view to obtain an updated complete image. The complete image may be updated (e.g., with the fused image) only if there is a change in the field of view (e.g., a specific object appears or an original object moves). Alternatively, different update rates may be set, for example, the first image and the second image (images containing information of the whole field of view) are used to update the complete image at a first update rate, and the fused image is used to update the complete image (corresponding parts that need to be updated or changed) at a second update rate, wherein the first update rate may be less than the second update rate (for example, 1 fps and 30 fps respectively), and the present application does not impose any restrictions on its specific values. In this way, the complete image may be updated with minimum data.

Embodiment 3

This embodiment proposes a design scheme of an imaging method that may adaptively adjust a quantization interval based on a high-resolution differential image with low bit width (e.g., ternary) and a low-resolution gray image with high bit width (e.g., 8 bits).

Step 3-1: A database of code rate—quantization interval—fusion quality is constructed: a database of code rate—quantization interval—fusion quality is constructed by using the existing public data sets.

Step 3-2: The quantization interval is determined for collecting low-resolution gray-scale images and high-resolution differential images. The initial code rate and fusion quality are set. For example, the resolution of the low-resolution gray-scale image is set to $\frac{1}{64}$ of the resolution of the high-resolution differential image, and the high-resolution differential image is set to be based on a difference between every two adjacent columns of its corresponding original image. Based on the set initial system code rate and fusion quality, the database constructed in step 3-1 is queried to determine the corresponding quantization interval, which is used to complete the collection of low-resolution gray-scale images and high-resolution differential images, so that they have different bit widths. The code rate and fusion quality may be adjusted manually in real time, and the corresponding quantization interval in the database will also change accordingly.

Then, steps 1-1 to 1-4 and steps 2-1 to 2-7 may be implemented.

Embodiment 4

This embodiment proposes an imaging method (for example, method 200) in which motion detection based on the differential images is added. Different from the traditional way of performing motion detection on the fused image (e.g., the third image), the method of this embodiment is to perform motion detection (e.g., image recognition as shown in step S40 in FIGS. 2A-2B) on the images (e.g., the low-resolution image with high bit width or the first image, and/or the high-resolution image with low bit width or the second image) before the fusing. After the motion regions (or regions of interest) are identified, only the motion regions (or regions of interest) are fused (for example, image fusion as shown in step S30 in FIGS. 2A-2B). The method may be implemented with reference to FIGS. 2A-2B. The specific steps of this method are described below by taking a high-resolution differential image with low bit width as an example.

Step 4-1: Same as Step 1-1 of Embodiment 1;
Step 4-2: Same as Step 1-2 of Embodiment 1;
Step 4-3: Same as Step 1-3 of Embodiment 1;
Step 4-4: An inter-frame method is used to calculate the difference between two adjacent high-resolution differential images with low bit-width, and the region with difference change (for example, the difference meets a certain threshold condition) is extracted to obtain the motion region (for example, in the form of coordinates), i.e., the region of interest.

Step 4-5: Same as steps 2-6 to 2-7 of Embodiment 2, to obtain a fused motion region;

Step 4-6: The fused motion region is used to update the previously captured complete image of the target field of view, and the regions in the complete image except the motion region will not be updated.

Step 4-7: Steps 4-1~4-6 are repeated.

Embodiment 5

This embodiment proposes an imaging method based on a low-resolution RGB image with high bit width (for example, 8 bits) and a high-resolution differential image with low bit width (for example, ternary).

Step 5-1: Low-resolution RGB images with high bit width and high-resolution differential images with low bit width are collected. In an example, the resolution of a low-resolution RGB image with high bit width is 1/64 of the resolution of the high-resolution differential image with low bit width, and the high-resolution differential image with low bit width may be based on the difference between every two adjacent columns of its corresponding original gray-scale image, and its default quantization intervals are (−255, −4), [−4, 4] and (4, 255), and the corresponding quantized values are −1, 0 and 1 respectively. By reducing the number of bits of the differential image, the collecting speed is improved, which is helpful to achieve the effect of real-time imaging.

Step 5-2: Same as Step 1-2 of Embodiment 1;

Step 5-3: Same as Step 1-3 of Embodiment 1;

Step 5-4: The collected RGB color images with low resolution and high bit width are combined for fusion. In this embodiment, an image fusion algorithm based on convolutional neural network is used to optimize the fusion and reconstruction of the two. In this embodiment, for the convolutional neural network, a number of channels of an input high-resolution differential image with low bit width and the low-resolution RGB image with high bit width are 1 and 3, respectively, while the resolution of an output high-resolution image with high bit width is the same as the resolution of the input high-resolution differential image with low bit width, and the number of channels is 3, i.e., the high-resolution RGB image with high bit width is output.

Figure 4A:
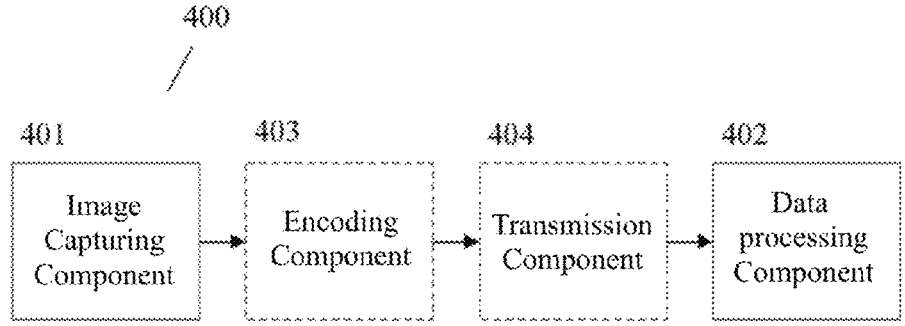
FIG. 4A is a structural block diagram of an apparatus for imaging according to an embodiment of the present application.
Figure 4B:
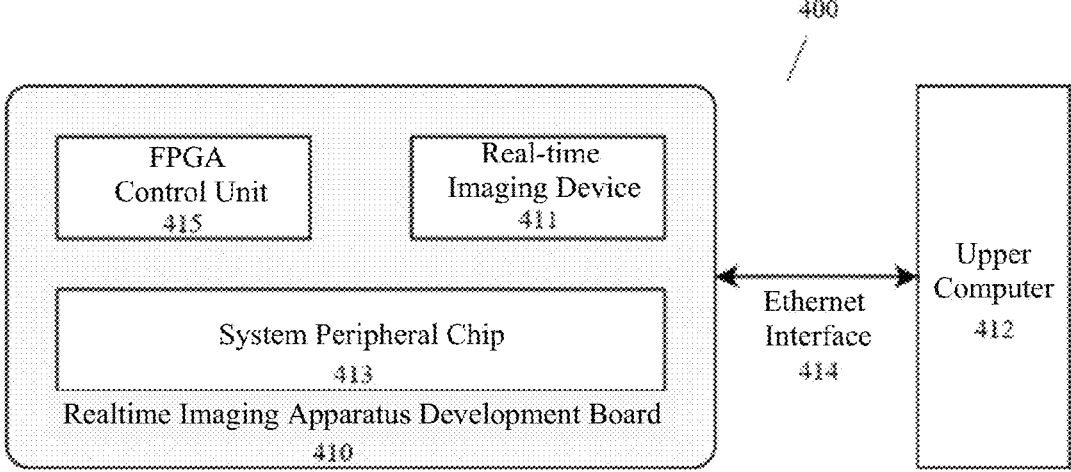
FIG. 4B is an exemplary embodiment of the apparatus for imaging according to an embodiment of the present application.

An Embodiment of the Apparatus for Real-Time Imaging According to the Present Application FIG. 4A is a structural block diagram of an apparatus 400 for imaging according to an embodiment of the present application, and FIG. 4B is an example implementation of the apparatus 400 for imaging according to an embodiment of the present application.

As shown in FIG. 4A, the apparatus 400 may include an image capturing component 401, a data processing component 402, an encoding component 403 and a transmission component 404. According to an embodiment, the image capturing component 401 may be configured to perform the operation of photographing (including photographing and quantifying) an image as described above. The data processing component 402 may be configured to perform operations associated with data processing, including operations such as image recognition, image fusion, and decoding. The encoding component 403 may be configured to encode data of the collected image for transmission to, for example, the data processing component 402 or other data processing apparatus. The transmission component 404 may be configured to transmit various data, for example, the encoded image data is transmitted from the encoding component 403 to the data processing component 402 for further processing. Various components included in the apparatus 400 may perform various operations under the control of a control component (not shown), for example.

As shown in FIG. 4B, the apparatus (e.g., apparatus 400) according to the present application may be implemented to include one real-time imaging apparatus development board 410 (which may be used as a combination of an image capturing component 401 and an encoding component 403) and an upper computer 412 (which may be used as a data processing component 402), which may be electrically connected via an Ethernet interface 414 (which may be used as a transmission component 404). The real-time imaging apparatus development board 410 may include a real-time imaging apparatus 411, an FPGA control unit 415, and a system peripheral chip 413. The upper computer 412 uses the Ethernet interface 414 to configure the real-time imaging apparatus development board 410. The FPGA control unit 415 and the system peripheral chip 413 on the real-time imaging apparatus development board 410 provide the real-time imaging apparatus 411 with time sequence signals and control voltages needed for operation according to the configuration information, and finally the collected image data is transmitted back to the upper computer 412 through the Ethernet interface 414 to complete one collection task.

Figure 5:
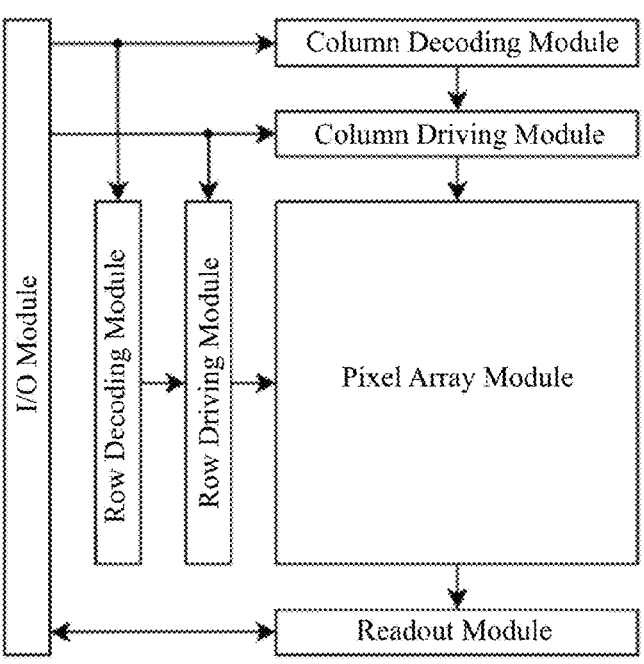
FIG. 5 is a structural block diagram of a real-time imaging apparatus according to an embodiment of the present application.

FIG. 5 is a structural block diagram of a real-time imaging apparatus (for example, real-time imaging apparatus 411) according to an embodiment of the present application. As shown in FIG. 5, the real-time imaging apparatus may include a pixel array module, a row/column driving module, a row/column decoding module, a readout module and an I/O module. The FPGA control unit (for example, the FPGA control unit 415) controls the row/column decoding module through the I/O interface module, and may provide working voltage for the row/column driving module, and at the same time, control the pixel array module to photosensitive a target scene, and finally read out the image data through the readout module.

Figure 6:
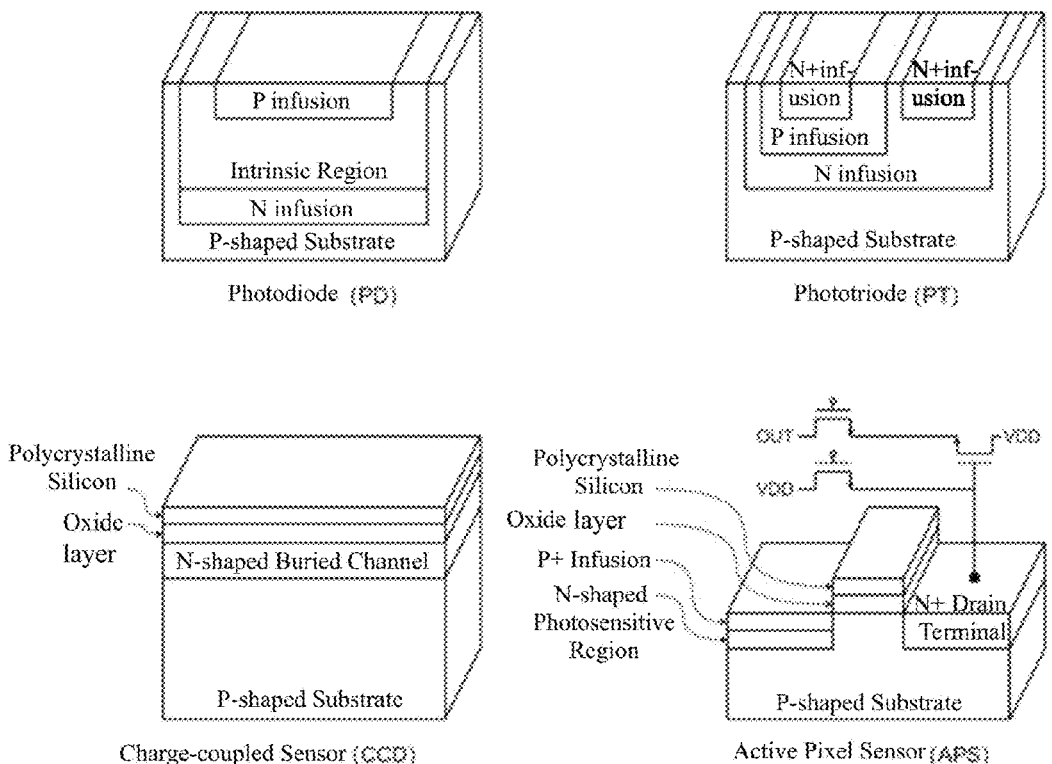
FIG. 6 is a schematic diagram of an alternative pixel unit of a pixel array module of a real-time imaging apparatus according to an embodiment of the present application.

FIG. 6 is a schematic diagram of an optional pixel unit of a pixel array module of a real-time imaging apparatus (for example, real-time imaging apparatus 411) according to an embodiment of the present application. As shown in FIG. 6, the pixel array module may include two levels of pixel unit and pixel array. At the pixel unit level, there are many choices based on planar silicon process manufacturing technology, such as photodiode (PD), phototransistor (PT), charge coupled device (CCD), active pixel sensor (APS) and so on.

Figure 7:
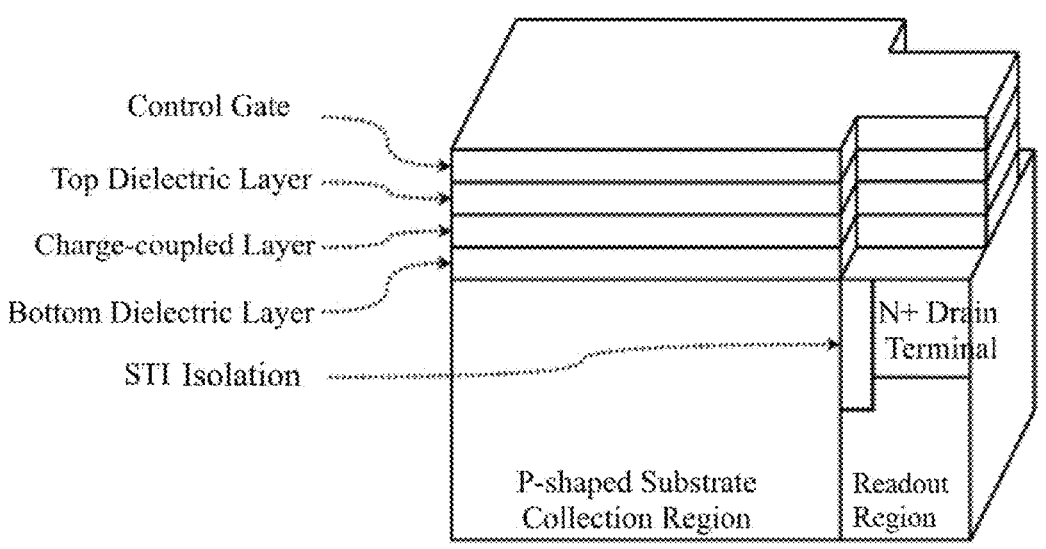
FIG. 7 is a schematic diagram of a pixel unit used by a pixel array module of a real-time imaging apparatus according to an embodiment of the present application.
Figure 8:
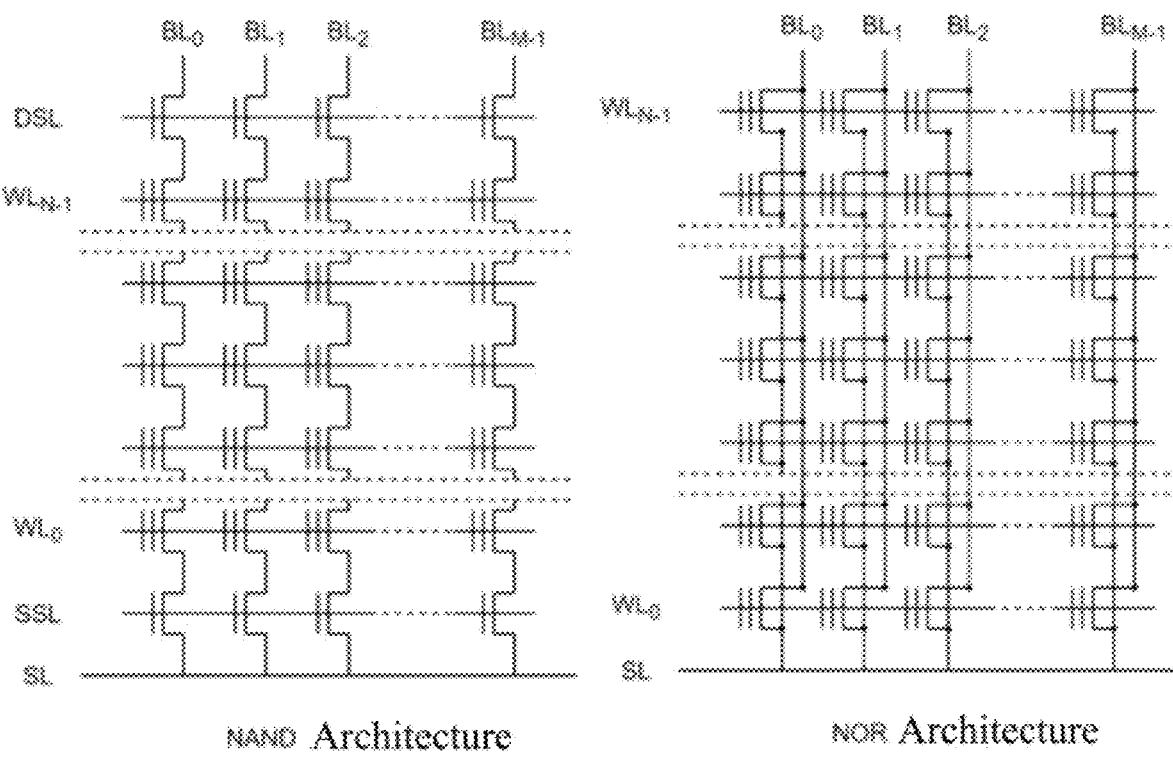
FIG. 8 is a schematic diagram of an alternative architecture of a pixel array module of a real-time imaging apparatus according to an embodiment of the present application.

FIG. 7 is a schematic diagram of a pixel unit used by a pixel array module of a real-time imaging apparatus (for example, real-time imaging apparatus 411) according to an embodiment of the present application. FIG. 8 is a schematic diagram of an alternative architecture of a pixel array module of a real-time imaging apparatus (for example, real-time imaging apparatus 411) according to an embodiment of the present application. In the present application, in a preferred embodiment of the pixel unit as shown in FIG. 6, a two-transistor photosensitive detector in CN201210442007.X as shown in FIG. 7 may be used. As shown in FIG. 8, the pixel array level may choose NAND architecture or NOR architecture, and in a preferred embodiment, NOR architecture may be used.

Figure 9:
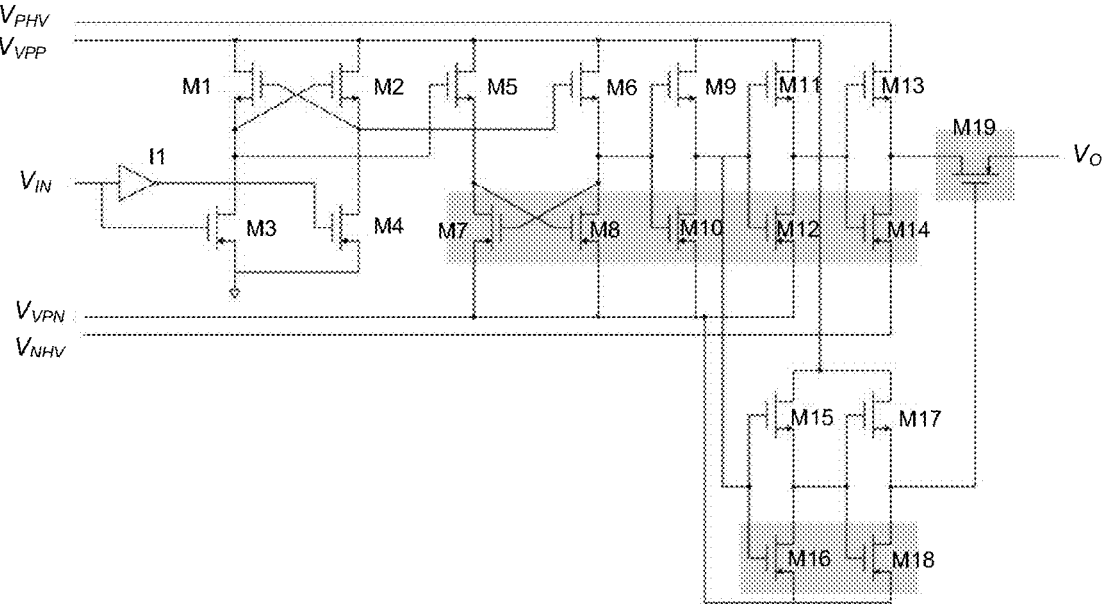
FIG. 9 is a multilevel shift circuit used by a row/column driving module of a real-time imaging apparatus according to an embodiment of the present application.

FIG. 9 is a multilevel shift circuit used by a row/column driving module of a real-time imaging apparatus (for example, real-time imaging apparatus 411) according to an embodiment of the present application. As shown in FIG. 9, as an example, the row/column driving module may use the multilevel shift circuit in CN202010384765.5. The module needs to input pre-shift positive voltage signal VVPP, pre-shift negative voltage signal VVPN, shift positive voltage signal VPHV, shift negative voltage signal VNHV and pre-shift control signal VIN. The shift voltage output signal VO outputs a shift positive voltage signal VPHV or a shift negative voltage signal VNHV under the control of the pre-shift control signal VIN to provide a driving voltage for the pixel array module.

Figure 10:
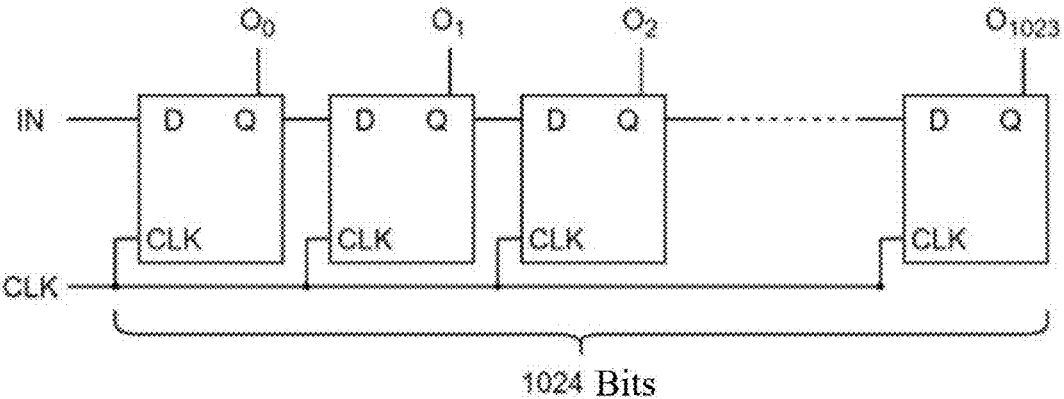
FIG. 10 is a schematic diagram of an alternative time sequential logic scheme of a row/column decoding module of a real-time imaging apparatus according to an embodiment of the present application.
Figure 11:
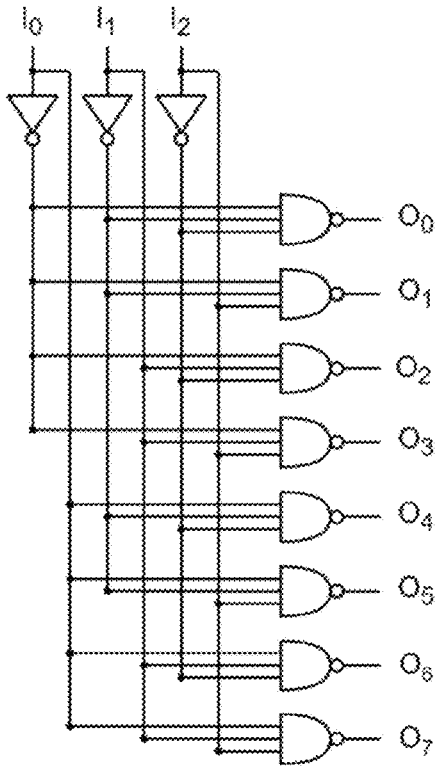
FIG. 11 is a schematic diagram of an alternative combined logic scheme of a row/column decoding module of a real-time imaging apparatus according to an embodiment of the present application.

According to the embodiment of the application, the row/column decoding module may use the sequential logic scheme of the shift register or the combined logic scheme of the decoder. FIG. 10 is a schematic diagram of an alternative sequential logic scheme of a row/column decoding module of a real-time imaging apparatus (for example, real-time imaging apparatus 411) according to an embodiment of the present application. In this embodiment, the combined logic scheme described by Verilog HDL is used. FIG. 11 is a schematic diagram of an alternative combined logic scheme of a row/column decoding module of a real-time imaging apparatus (for example, real-time imaging apparatus 411) according to an embodiment of the present application. As an example, a 1024-bit sequential logic scheme (FIG. 10) and an 8-bit combined logic scheme (FIG. 11) may be used.

Figure 12:
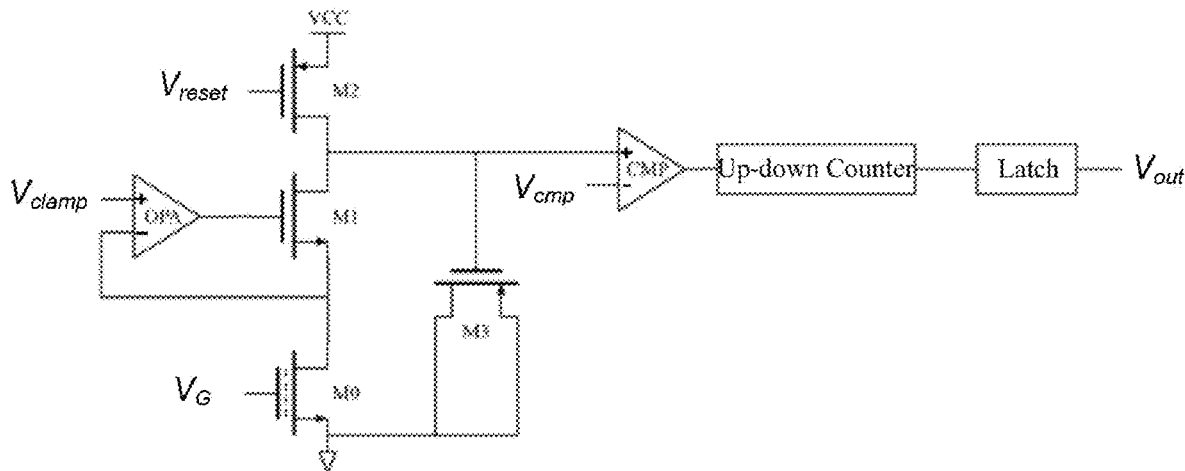
FIG. 12 is a schematic diagram of a readout module for a low-resolution original image with high bit width of a real-time imaging apparatus according to an embodiment of the present application.
Figures 13, 14:
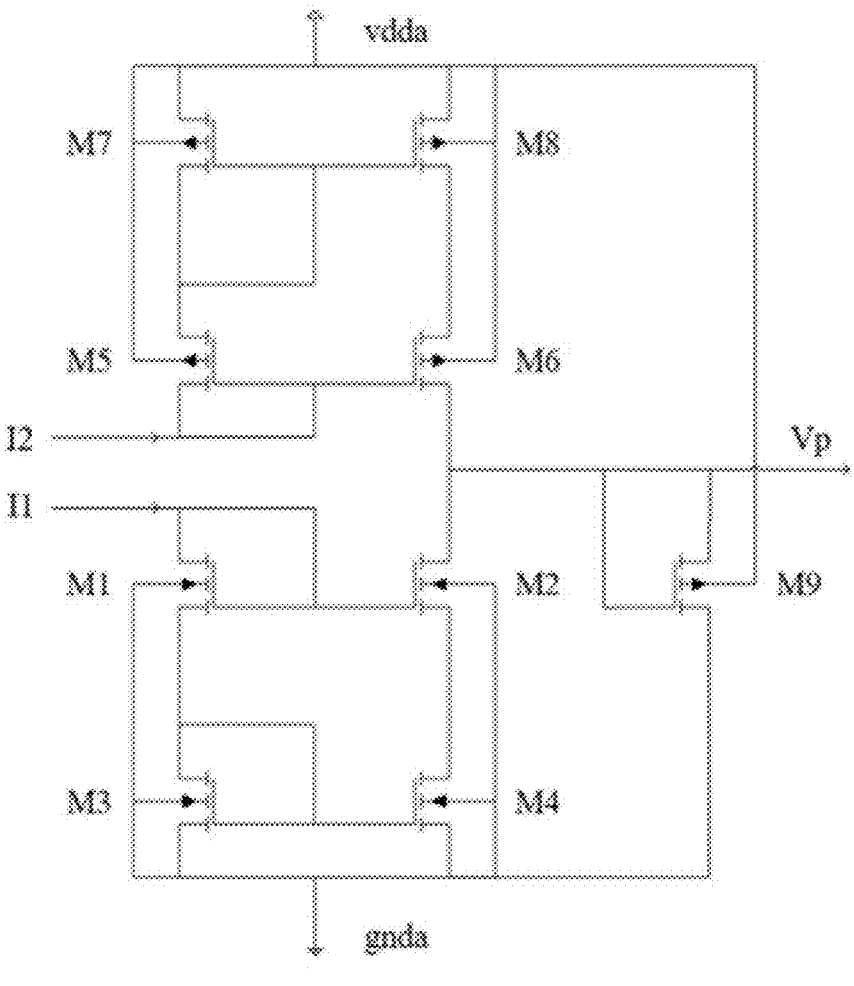
FIG. 13 is a schematic diagram of a readout module of a real-time imaging apparatus for a high-resolution differential image with low bit width according to an embodiment of the present application.
FIG. 14 is a schematic diagram of a readout module of a real-time imaging apparatus according to an embodiment of the present application for a low-resolution original image with high bit width and a high-resolution differential image with low bit width.

FIGS. 12-14 are schematic diagrams of different embodiments of a readout module of a real-time imaging apparatus (for example, real-time imaging apparatus 411) according to an embodiment of the present application. The readout module may be implemented in two ways, i.e., the readout circuits may be designed for the high-resolution differential image with low bit width and the low-resolution original image with high bit width respectively, or the readout circuits of the high-resolution differential image with low bit width and the low-resolution original image with high bit width may be combined. For the first scheme, the readout circuit in the existing patent CN201911257219.9 (as shown in FIG. 12) may be used to read out the low-resolution original image with high bit width, and a current subtraction circuit in the existing patent CN202010697791.3 (as shown in FIG. 13) may be used to read out the high-resolution differential image with low bit width. For the second scheme, the readout circuit in the patent CN201911257219.9 (as shown in FIG. 12) may be used again. When reading out the low-resolution original image with high bit width, an up-down counter is configured to count up, while when reading out the high-resolution differential image with low bit width, the up-down counter is configured to count up, and then configured to count down, so as to realize differential reading out. The present application uses a novel readout circuit (as shown in FIG. 14). When the low-resolution original image with high bit width is operated, DIR is 0, a current mirror CM1 works, and the current of BLN is used to discharge a capacitor C. When the voltage on the capacitor is discharged below a reference voltage VP of a comparator CMP1, the counter keeps working, and when the voltage on the capacitor is discharged below the reference voltage VP, the counter stops working, and the quantization result is sent out through the parallel-serial conversion module. When operating on a high-resolution differential image with low bit width, DIR is 1, the current mirrors CM1 and CM2 work at the same time, and the current of BLN-BLN+1 is used to discharge the capacitor C. After passing through the comparators CMP1 and CMP2, a 2-bit quantization result is obtained, and is sent out through the parallel-serial conversion module. I/O interface module may use any general input/output interface with ESD protection function from any manufacturer.

It should be noted that all the embodiments in this specification are described in a progressive way, and each embodiment focuses on the differences from other embodiments, so it is only necessary to refer to the same and similar parts of each embodiment.

In several embodiments provided in this application, it should be understood that each block in the flowchart or block diagram may represent one module, program segment or part of code, which contains one or more executable instructions for implementing specified logical functions. It should also be noted that in some alternative implementations, the functions noted in the blocks may occur in a different order from those noted in the drawings. For example, two consecutive blocks may actually be executed substantially in parallel, and they may sometimes be executed in a reverse order, depending on the functions involved. It should also be noted that each block in the block diagrams and/or flowcharts, and combinations of blocks in the block diagrams and/or flowcharts, may be realized by a dedicated hardware-based system that performs specified functions or actions, or may be realized by a combination of dedicated hardware and computer instructions.

If the functions are realized in the form of software functional modules and sold or used as independent products, they may be stored in computer-readable storage media. Based on this understanding, essence of the technical solution of the present disclosure or the part that makes contributions to the existing technology, or the part of the technology scheme may be embodied in the form of a software product, and the computer software product is stored in a storage medium and includes several instructions to make one computer device (which may be a personal computer, a server, a network apparatus, etc.) execute all or part of the steps of the method described in various embodiments of the present disclosure. The aforementioned storage media include: U disk, mobile hard disk, Read-Only Memory (ROM), Random Access Memory (RAM), magnetic disk or optical disk and other media that may store program codes.

It should also be noted that in this paper, relational terms such as first and second are only used to distinguish one entity or operation from another entity or operation, and do not necessarily require or imply any such actual relationship or order between these entities or operations. Moreover, the terms "including", "comprising" or any other variation thereof are intended to cover non-exclusive inclusion, so that a process, method, article or apparatus including a series of elements includes not only those elements, but also other elements not explicitly listed or elements inherent to such a process, method, article or apparatus. Without further restrictions, an element defined by the phrase "including one" does not exclude the existence of other identical elements in the process, method, article or apparatus including the element.

It is not difficult for a person skilled in the art to reasonably understand the details not described in detail in the methods, apparatus and other schemes of the present application and their embodiments according to the above disclosure of the present application. All the contents mentioned above belong to the protection scope of the present application.

What is claimed is:

1. A method for imaging, comprising:
for a target field of view, performing photographing and quantification at a first resolution, so as to obtain a first image that has a first bit width;
for the target field of view, performing photographing and differential processing at a second resolution, so as to obtain a second image that has a second bit width, wherein the differential processing includes: for a pixel point which is obtained by means of photographing at the second resolution, quantifying the difference between the pixel point and a neighboring or adjacent pixel point of the pixel point, so as to obtain a quantified difference as a value of a corresponding pixel point in the second image; and
fusing the first image with the second image, so as to obtain a third image, wherein the first resolution is lower than the second resolution, and the first bit width is higher than the second bit width, wherein the fusing the first image with the second image, so as to obtain the third image further comprises:

determining a region of interest of the target field of view in the second image using an image recognition method;

obtaining a region in a first image that corresponds to the region of interest; and fusing the corresponding region of the first image with the region of interest of the second image to obtain the third image.

2. The method according to claim 1, further comprising: encoding the second image for transmission before the fusing, and decoding the second image for fusion after the transmission.

3. The method according to claim 2, wherein the second image is encoded using run-length encoding, and wherein a bit sequence of the second image is encoded into a counting sequence L recording the number of repetitions of repeated data and a data sequence D recording the repeated data itself.

4. The method according to claim 3, wherein Huffman encoding is used to record the counting sequence L, and fixed-length coding is used to record the data sequence D.

5. The method according to claim 1, wherein the fusing the first image and the second image comprises: fusing the first image and the second image using a convolutional neural network.

6. The method according to claim 1, wherein the determining the region of interest of the target field of view in the second image using the image recognition method comprises: determining the region of interest by combining images captured for the target field of view within a specific time range or previously stored images captured for the target field of view.

7. The method according to claim 1, further comprising using deep learning to train the image recognition method based on a selected target, spatial conditions when photographing and manual annotations.

8. The method according to claim 1, wherein the fusing the region of interest with the corresponding region to obtain the third image further comprises: fusing the region of interest with the corresponding region to obtain the third image only when the region of interest includes a specific object.

9. The method according to claim 1, further comprising outputting the third image after fusion or outputting an updated complete image after updating the complete image with the third image.

10. An apparatus for imaging, comprising:

an image capturing component, configured to: a storage medium storing instructions; and one or more computer devices which, when reading the instructions, executes a method for imaging comprising steps of:

for a target field of view, performing photographing and quantification at a first resolution, so as to obtain a first image that has a first bit width; and for the target field of view, performing photographing and differential processing at a second resolution, so as to obtain a second image that has a second bit width, wherein the differential processing includes: for a pixel point which is obtained by means of photographing at the second resolution, quantifying the difference between the pixel point and a neighboring or adjacent pixel point of the pixel point, so as to obtain a quantified difference as a value of a corresponding pixel point in the second image; and fusing the first image with the second image, so as to obtain a third image, wherein the first resolution is lower than the second resolution, and the first bit width is higher than the second bit width, wherein the one or more computer devices which, when reading the instructions, executes the fusing the first image with the second image, so as to obtain the third image, by:

determining a region of interest of the target field of view in the second image using an image recognition method;

obtaining a region corresponding to the region of interest in the first image; and fusing the corresponding region of the first image with the region of interest of the second image to obtain the third image.

11. The apparatus according to claim 10, further wherein the one or more computer devices which, when reading the instructions, further executes:

encoding the second image before the fusing, transmitting the encoded second image to the data processing component; and decoding the encoded second image for fusion after receiving the encoded second image.

12. The apparatus according to claim 11, wherein, wherein the one or more computer devices which, when reading the instructions, executes the encoding the second image by encoding the second image using run-length encoding, and wherein a bit sequence of the second image is encoded into a counting sequence L recording the number of repetitions of repeated data and a data sequence D recording the repeated data itself.

13. The apparatus according to claim 12, wherein, the one or more computer devices which, when reading the instructions, executes the encoding the second image by recording the counting sequence L using Huffman encoding and record the data sequence D using fixed-length encoding.

14. The apparatus according to claim 10, wherein the one or more computer devices which, when reading the instructions, executes the fusing the first image and the second image by fusing the first image and the second image using a convolutional neural network.

15. The apparatus according to claim 10, wherein the one or more computer devices which, when reading the instructions, executes the determining the region of interest of the target field of view in the second image using the image recognition method by determining the region of interest by combining images captured for the target field of view within a specific time range or previously stored images captured for the target field of view.

16. The apparatus according to claim 10, wherein the one or more computer devices which, when reading the instructions, further executes using deep learning to train the image recognition method based on a selected target, spatial conditions when photographing and manual annotations.

17. A non-transitory computer-readable medium having program codes recorded thereon, which, when executed by a computer, performs the method for imaging, wherein the method comprises:

for a target field of view, performing photographing and quantification at a first resolution, so as to obtain a first image that has a first bit width;

for the target field of view, performing photographing and differential processing at a second resolution, so as to obtain a second image that has a second bit width, wherein the differential processing includes: for a pixel point which is obtained by means of photographing at the second resolution, quantifying the difference between the pixel point and a neighboring or adjacent pixel point of the pixel point, so as to obtain a quantified difference as a value of a corresponding pixel point in the second image; and fusing the first image with the second image, so as to obtain a third image, wherein the first resolution is lower than the second resolution, and the first bit width is higher than the second bit width, wherein the fusing the first image with the second image, so as to obtain the third image further comprises: determining a region of interest of the target field of view in the second image using an image recognition method; obtaining a region in a first image that corresponds to the region of interest; and fusing the corresponding region of the first image with the region of interest of the second image to obtain the third image.

* * * * *